(12) United States Patent
Bennett et al.

(10) Patent No.: US 7,394,770 B2
(45) Date of Patent: Jul. 1, 2008

(54) USE OF SYNCHRONIZED CLOCKS TO PROVIDE INPUT AND OUTPUT TIME STAMPS FOR PERFORMANCE MEASUREMENT OF TRAFFIC WITHIN A COMMUNICATIONS SYSTEM

(75) Inventors: Jon Claude Russell Bennett, Sudbury, MA (US); Gerard White, Dunstable, MA (US)

(73) Assignee: General Instrument Corporation, Horsham, PA (US)

( * ) Notice: Subject to any disclaimer, the term of this patent is extended or adjusted under 35 U.S.C. 154(b) by 792 days.

(21) Appl. No.: 10/694,632

(22) Filed: Oct. 27, 2003

(65) Prior Publication Data
US 2004/0141527 A1    Jul. 22, 2004

Related U.S. Application Data

(60) Provisional application No. 60/421,183, filed on Oct. 25, 2002, provisional application No. 60/421,303, filed on Oct. 25, 2002.

(51) Int. Cl.
*H04L 12/26* (2006.01)
*H04L 12/28* (2006.01)
*G06F 17/173* (2006.01)
(52) U.S. Cl. .................. 370/252; 370/389; 709/224
(58) Field of Classification Search .................. None
See application file for complete search history.

(56) References Cited

U.S. PATENT DOCUMENTS

| 6,078,595 | A  | * | 6/2000 | Jones et al. | 370/503 |
| 6,324,170 | B1 | * | 11/2001 | McClennon et al. | 370/286 |
| 6,631,483 | B1 | * | 10/2003 | Parrish | 714/55 |
| 6,662,223 | B1 | * | 12/2003 | Zhang et al. | 709/224 |
| 6,898,709 | B1 | * | 5/2005 | Teppler | 713/178 |
| 6,943,609 | B2 | * | 9/2005 | Zampetti et al. | 327/292 |
| 2001/0013067 | A1 | * | 8/2001 | Koyanagi et al. | 709/230 |
| 2003/0007491 | A1 | * | 1/2003 | Read et al. | 370/395.1 |
| 2003/0093244 | A1 | * | 5/2003 | Corlett et al. | 702/186 |
| 2004/0066775 | A1 | * | 4/2004 | Grovenburg | 370/350 |

* cited by examiner

*Primary Examiner*—Huy D. Vu
*Assistant Examiner*—Clemence Han
(74) *Attorney, Agent, or Firm*—Larry T. Cullen

(57) ABSTRACT

A method (60; 70) for processing data packets allows the same hardware that is used in a traffic-forwarding path to add timestamps to the data, which allow accurate measurements to be taken. By adding this function in the forwarding equipment itself, the measurements can be taken in a true operational network, i.e., under actual usage conditions. Moreover, if multiple systems in the traffic path support this functionality, the value of the measurements is enhanced to enable end-to-end path guarantees. One exemplary embodiment (10) of the present invention uses synchronized clocks to provide timestamps for use in performance monitoring within an operational system. Synchronized clock signals can be used to accurately time stamp incoming and outgoing packets to provide performance measurement of traffic through the system under actual operating conditions.

14 Claims, 8 Drawing Sheets

BITS Clock Interface Diagram

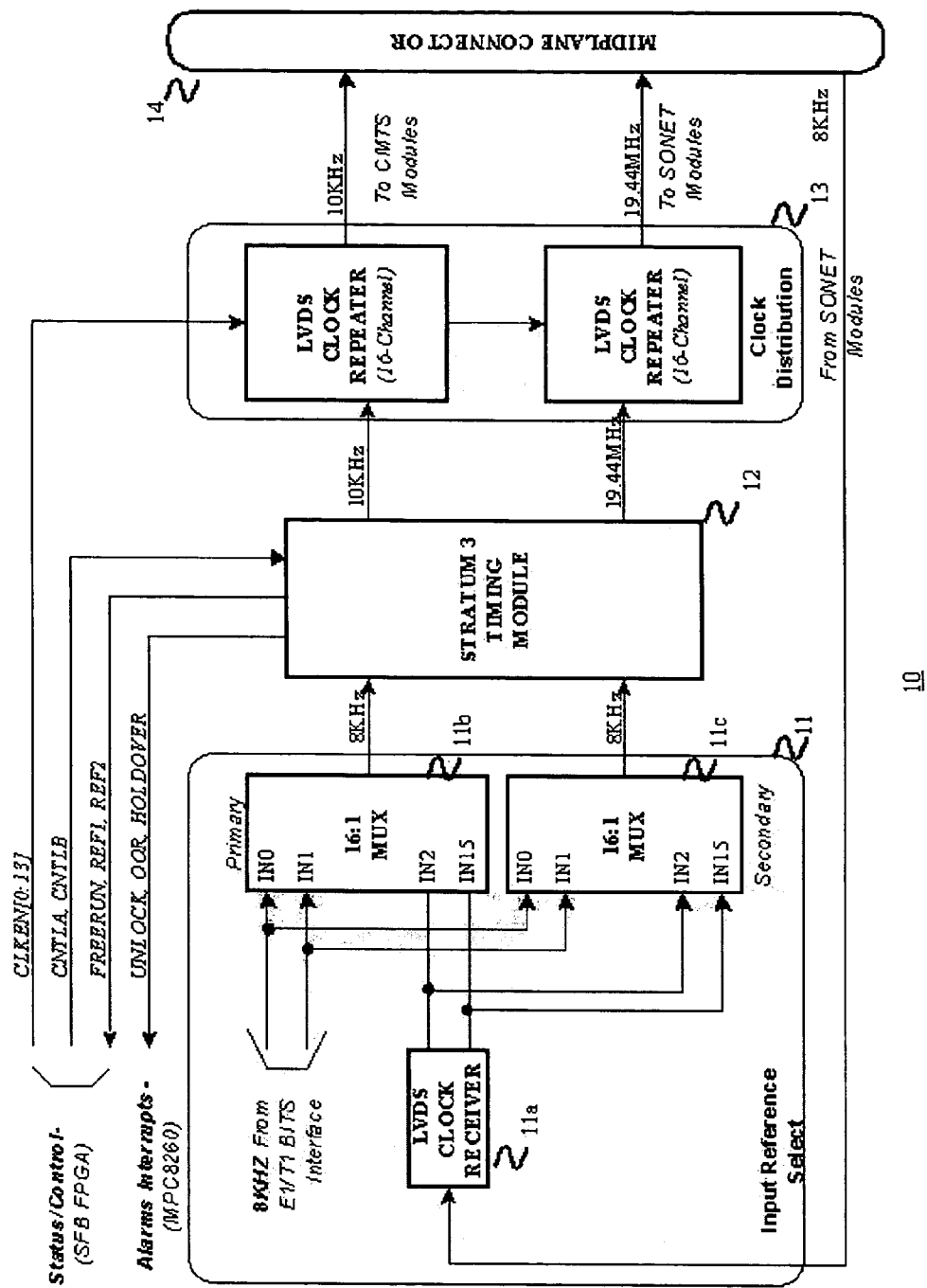
FIG 1 - System Timing and Clock Distribution Subsystem

FIG 2 – Table 1 Stratum 3 Timing Module Operational Modes

| CONTROL INPUT | | OPERTIONAL MODE | | STATUS | | | | ALARMS | | |
|---|---|---|---|---|---|---|---|---|---|---|
| A | B | | | REF 1 | REF 2 | FREE RUN | HOLD OVER | HOLD OVER | OOR | UN-LOCK |
| 0 | 0 | FREE RUN | | 0 | 0 | 1 | 0 | 0 | 0 | 1 |
| 1 | 0 | EXTERNAL REFERENCE 1 | Normal | 1 | 0 | 0 | 0 | 0 | 0 | 0 |
| 1 | 0 | EXTERNAL REFERENCE 1 | Out Of Range | 1 | 0 | 0 | 0 | 0 | 1 | 1 |
| 1 | 0 | EXTERNAL REFERENCE 1 | Lost Of Signal/ Lost Of Lock | 1 | 0 | 0 | 0 | 0 | 0 | 1 |
| 0 | 1 | EXTERNAL REFERENCE 2 | Normal | 0 | 1 | 0 | 0 | 0 | 0 | 0 |
| 0 | 1 | EXTERNAL REFERENCE 2 | Out Of Range | 0 | 1 | 0 | 0 | 0 | 1 | 1 |
| 0 | 1 | EXTERNAL REFERENCE 2 | Lost Of Signal/ Lost Of Lock | 0 | 1 | 0 | 0 | 0 | 0 | 1 |
| 1 | 1 | HOLDOVER | | 0 | 0 | 0 | 1 | 1 | 0 | 1 |

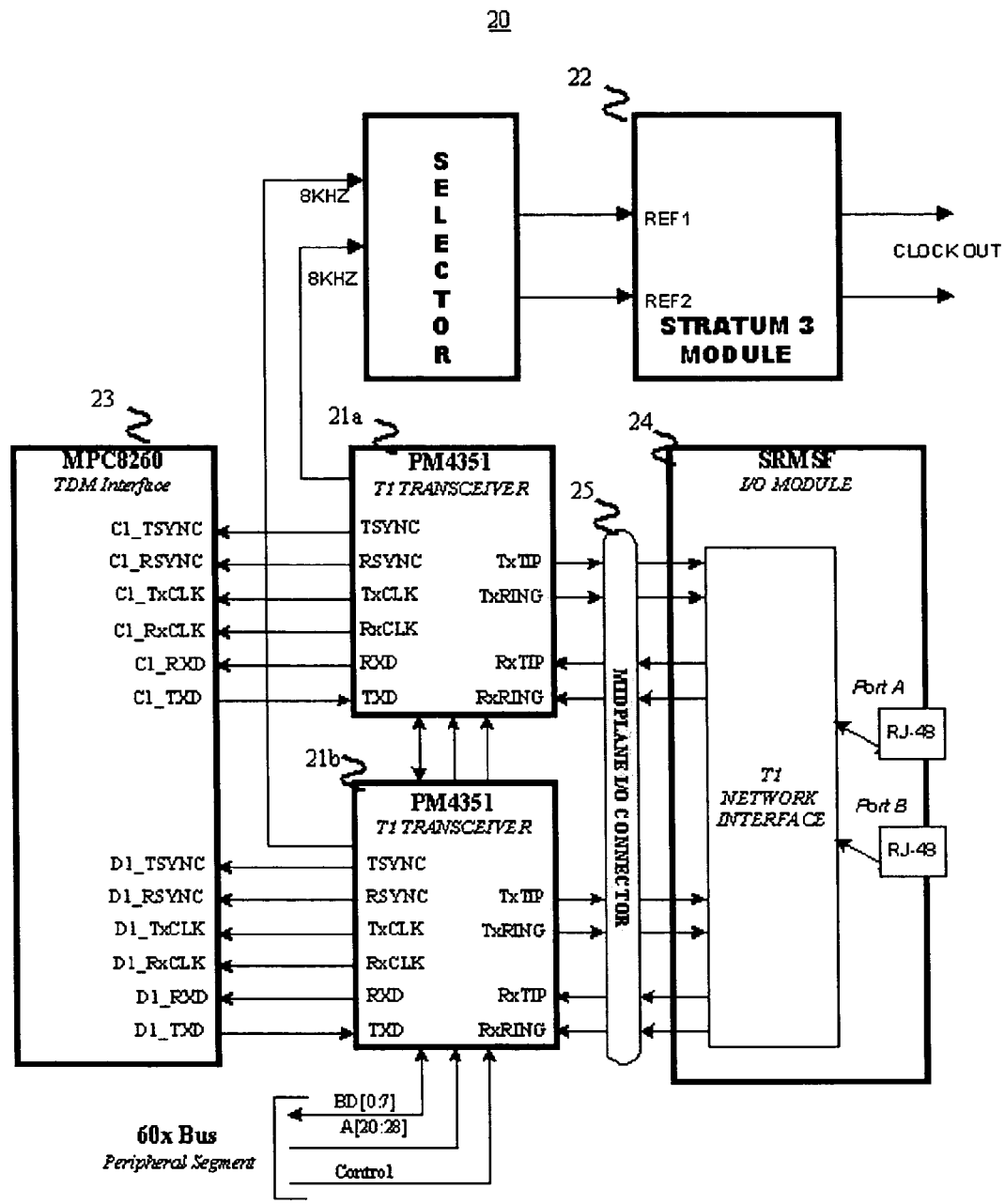
FIG 3 -- BITS Clock Interface Diagram

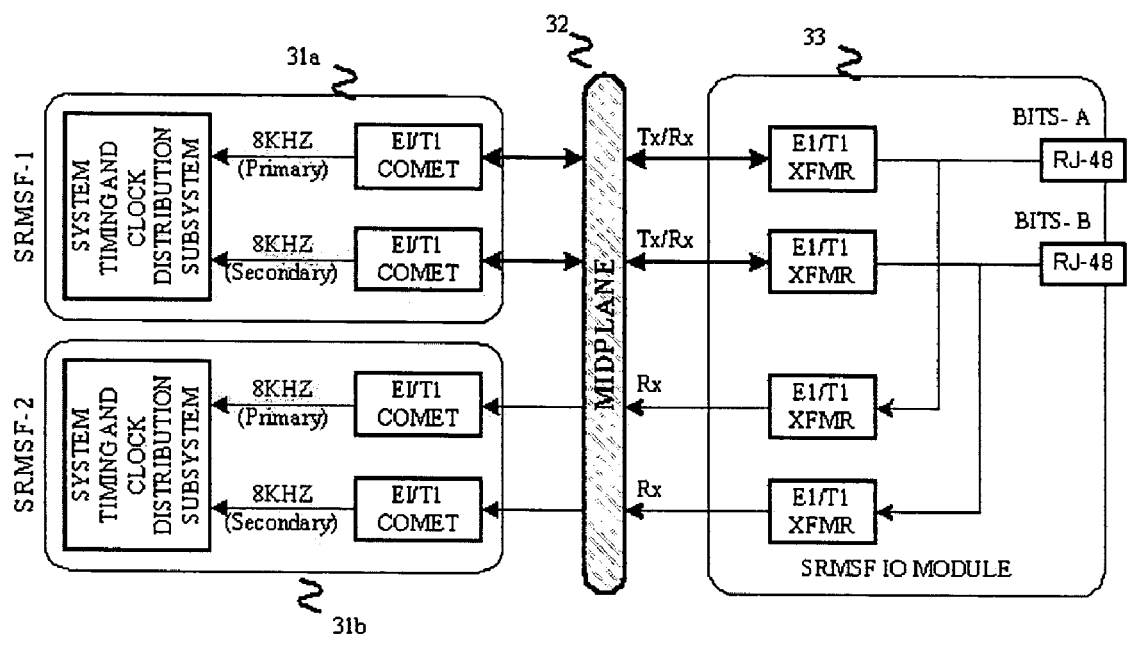
FIG 4 – BITS Clock Redundancy

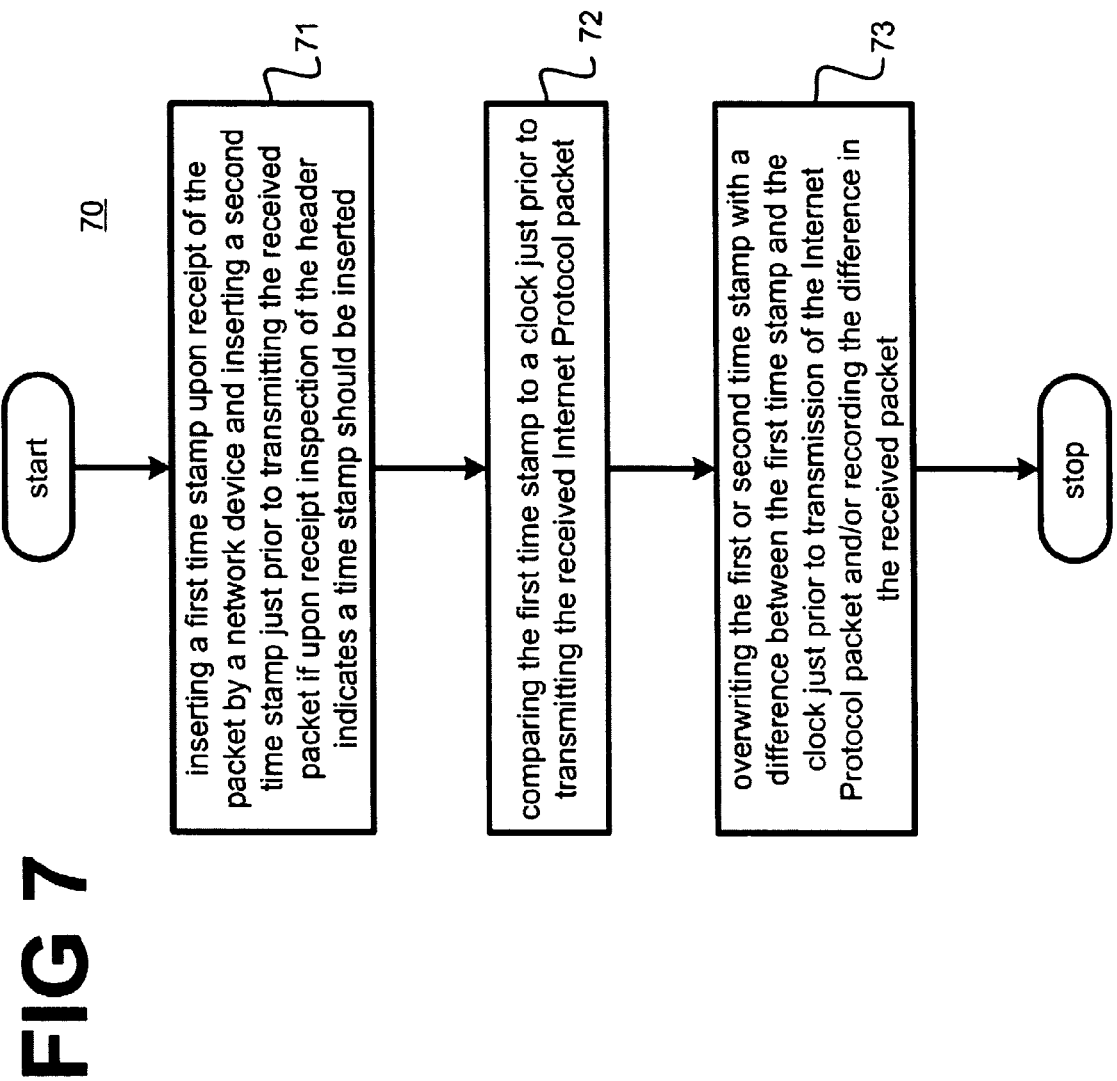

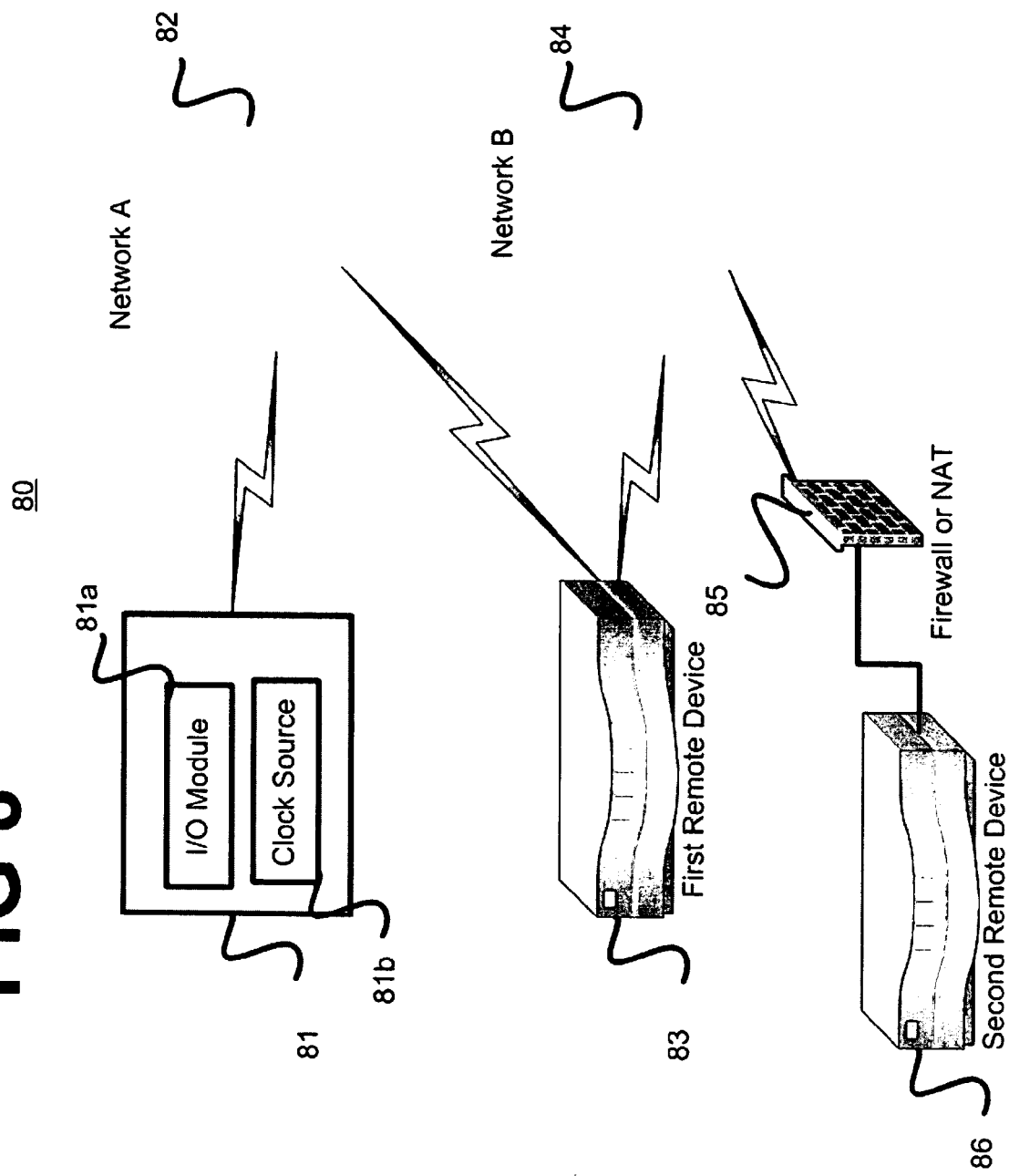

USE OF SYNCHRONIZED CLOCKS TO PROVIDE INPUT AND OUTPUT TIME STAMPS FOR PERFORMANCE MEASUREMENT OF TRAFFIC WITHIN A COMMUNICATIONS SYSTEM

RELATED APPLICATIONS

This application claims the benefit of U.S. Provisional Application No. 60/421,183, filed Oct. 25, 2002 by the same inventors, entitled "Use of Synchronized Clocks to Provide Input and Output Time Stamps for Performance Measurement of Traffic within a Communications System." This application is also related to U.S. Provisional Application No. 60/421,303 entitled "IP Measurement Protocol" and filed on Oct. 25, 2002 by one of the same inventors.

FIELD OF THE INVENTION

The present invention is directed generally to methods and apparatuses for transmitting data packets over computer networks, and more particularly to a method and apparatus for transmitting data packets over a public computer network via switches and routers for which quality of service is significant.

BACKGROUND

Packet based data communications (e.g., IP traffic) is evolving from a best effort delivery system to a system for supporting applications that require a defined quality of service, at least in terms of latency and jitter. Currently, it is not possible to measure latency and jitter for actual user traffic in an operational packet forwarder, such as an IP switch or router.

Existing switches and routers do not support such measurements by injecting measurement information, such as timestamps. Test equipment vendors can provide accurate timestamps only by connecting test equipment to the interfaces under test and injecting test traffic. This requires expensive external equipment, is invasive in nature and is not an operational measurement as interfaces must be disconnected from the network and connected to the test equipment. Moreover, such a test configuration can only test the equipment under test—not a path through a network.

The present invention is therefore directed to the problem of developing a method and apparatus for enabling performance testing and measurement of individual network equipment, as well as a network path, in a true operational fashion.

SUMMARY OF THE INVENTION

The present invention solves these and other problems by providing inter alia a method for processing data packets that allows the same hardware that is used in a traffic-forwarding path to add timestamps to the data, which allow accurate measurements to be taken. By adding this function in the forwarding equipment itself, the measurements can be taken in a true operational network, i.e., under actual usage conditions. Moreover, if multiple systems in the traffic path support this functionality, the value of the measurements is enhanced to enable end-to-end path guarantees.

According to another aspect of the present invention, an exemplary embodiment of a method for processing data packets inserts time stamps upon receipt and also upon transmission. Moreover, by employing a single clock source from which both the input and output time stamps are derived, an exemplary embodiment of the present invention removes clock uncertainty from the timestamps, thereby enabling an accurate measurement of latency and other aspects of a network device processing the data packets.

According to another aspect of the present invention, one exemplary embodiment of the present invention uses synchronized clocks to provide timestamps for use in performance monitoring within an operational system. For example, the synchronized clock signals in the Motorola Broadband Service Router (BSR) 64000 can be used to accurately time stamp incoming and outgoing packets to provide performance measurement of traffic through the system under actual operating conditions.

According to one aspect of the present invention, an accurate clock reference is derived from either an internal hardware clock or an external clock source, such as a "BITS" (Building Integrated Timing Supply) clock, a synchronous interface, such as SONET, or a GPS receiver. The clock signal is converted to a convenient frequency for internal use (e.g., low enough to be delivered to all interface cards with sufficient integrity, but high enough to provide the required accuracy). The signal is distributed to interface cards via hardware (e.g., using dedicated traces in a mid-plane or back-plane PCB). The timing signal is delivered to the forwarding subsystem of each line card. If transmitting is done in hardware, such as an FPGA or ASIC, the timing signals are provided to the transmitting hardware itself. If firmware or software transmission is used (e.g., a network processor or CPU) the timing signals are converted into a form which can be read by the forwarding software (e.g., placed in a register).

According to another aspect of the present invention, during packet transmission each packet is inspected for the presence of a field in the packet header, which field indicates timestamps should be added (e.g., IPMP). If time stamping is indicated, the current value of the clock is inserted. Note that for maximum value the input time stamp should be inserted as soon as possible after packet reception and the output time stamp as late as possible before transmission.

According to another aspect of the present invention, the above process can be used to provide latency statistics through an Internet device, by double stamping and recording the difference between the two stamps. This can also be done in a compliant manner by comparing the first stamp to the real time clock to get the difference and then overwriting the stamp, or just leaving the first stamp in place. By combining synchronized clocks used for RF synchronization in the BSR64000 with the Internet Measurement Protocol, the present invention provides a powerful technique for establishing the performance of an Internet device.

Other aspects of the present invention will be apparent to those reviewing the following drawings in light of the specification.

BRIEF DESCRIPTION OF THE DRAWINGS

FIG. 1 depicts a block diagram of an exemplary embodiment of a System Timing and Clock Distribution Subsystem according to one aspect of the present invention.

FIG. 2 depicts a table of Stratum 3 Timing Module Operational Modes according to another aspect of the present invention.

FIG. 3 depicts a block diagram of an exemplary embodiment of a BITS Clock Interface according to still another aspect of the present invention.

FIG. 4 depicts a block diagram of an exemplary embodiment of a BITS Clock Redundancy system according to yet another aspect of the present invention.

FIG. 7 depicts a flow chart of another exemplary embodiment of a method for processing packets in a network according to still another aspect of the present invention.

FIG. 8 depicts an exemplary embodiment of a network operating according to another aspect of the present invention.

DETAILED DESCRIPTION

Figure 5:
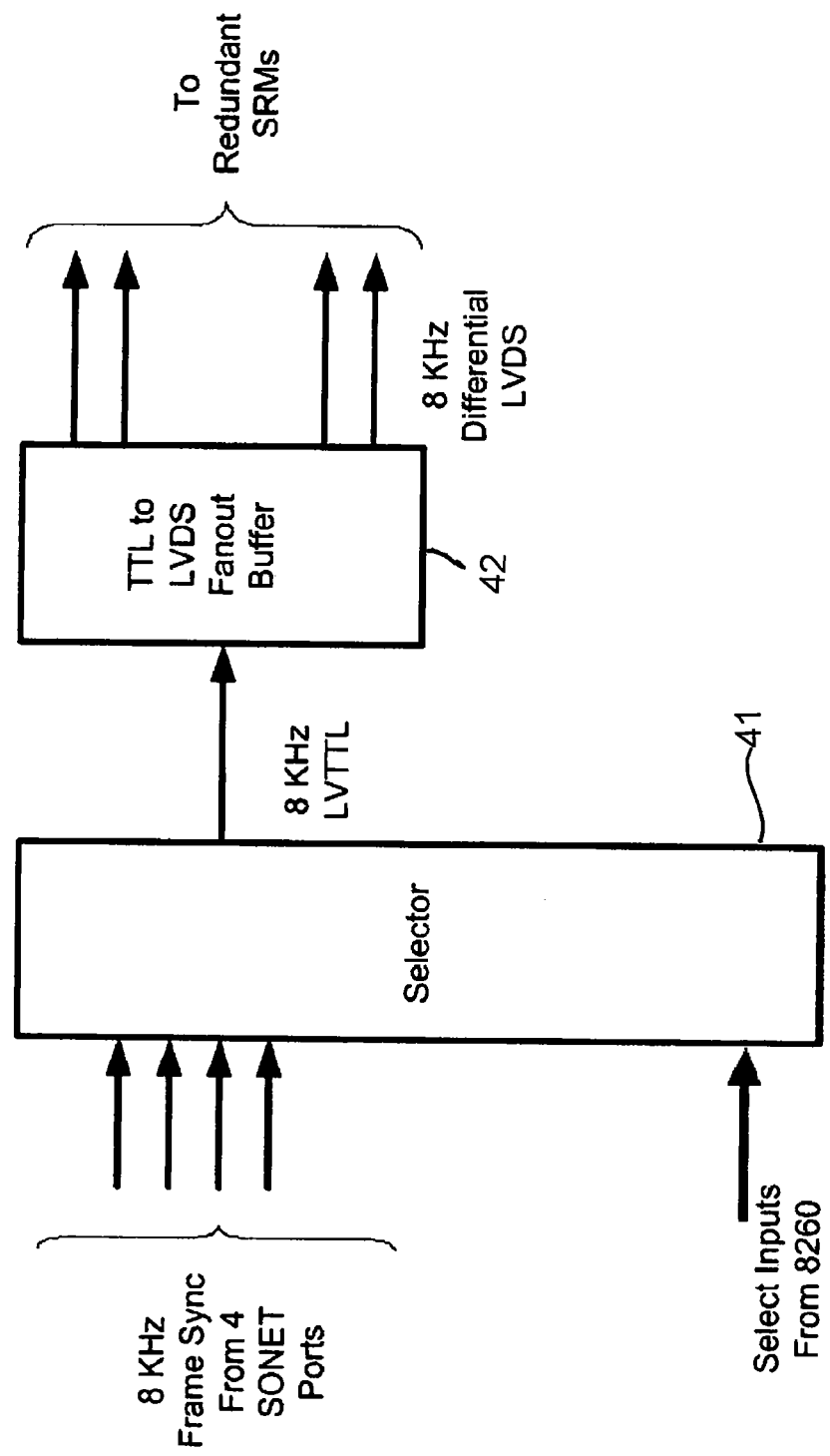
FIG. 5 depicts a block diagram of an exemplary embodiment of a SONET Clock Extraction system according to yet another aspect of the present invention.

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

One application of the present invention enables the testing of a device for compliance with the Expedited Forwarding Per-Hop Behavior, as described in IETF RFC 3246 (which is hereby incorporated by reference as if repeated herein in its entirety). This is accomplished by inserting a timestamp in the packet both when it is received and when it is transmitted. By comparing the timestamps of when packets were received and when they were transmitted it can be determined if the device transmitted the packets in a manner which conformed to the requirements of RFC 3246. In general any test which attempts to determine if a given packet or packets were transmitted in the correct order, or at the correct time, based on the time that they were received, either individually or as a group may be performed by using this double time stamping approach. The present invention does not require that IPMP packets be used in which to place the timestamps, rather, any packet containing sufficient room to hold the timestamps may be employed for the purposes herein.

Nevertheless, some of the embodiments of the present invention employ an Internet Protocol Measurement Protocol (IPMP) as set forth in the above mentioned U.S. Provisional Patent Application, which U.S. Provisional Application No. 60/421,303 is hereby incorporated by reference as if repeated herein in its entirety, including the drawings.

The following sets forth the electrical architecture and functional behavior of the synchronous clocking support for the BSR64000 system. Similar designs and functions can be implemented in any packet forwarding or Internet device.

The clocking subsystem is composed of the following components:
BITS clock source
SONET clock Source
System Timing and Clock Distribution The BITS and SONET clock sources provide alternate sources for an external reference clock to be used. The system timing and clock distribution module allows selection of the clock source to be used and distribution of the derived clock signals through the system.

System Timing and Clock Distribution

A System Timing and Clock Distribution subsystem is provided for management of multiple synchronization-input references, and to provide flexible synchronization distribution throughout the system. FIG. 1 shows a block diagram of the System Timing and Clock Distribution subsystem 10, which consists of the following functional blocks:
Input Reference 11
Stratum 3 Timing Module 12
Clock Distribution 13

Input Reference

The Input Reference block 11 consists of Low Voltage Differential Signaling (LVDS) receivers 11a and dual 16:1 Multiplexers 11b, 11c. The input reference block 11 receives 8 kHz clocks from two different sources. One source is the BITS clock that is derived from an external E1/T1 network (not shown), and the other is derived from SONET Trunking modules in the system (not shown).

Two 16:1 MUXes 11b, 11c each accept sixteen input reference clocks, two TTL level 8 kHz clocks from the Ti transceivers, and fourteen LVDS differential 8 kHz clock, one from each SONET module (not shown) in the system. System software can control the source selected by each 16:1 MUX through the SFB FPGA Clock Distribution and Control interface (not shown). The output of each MUX 11b, 11c supplies the primary and secondary reference inputs to the Stratum 3 module 12.

Stratum 3 Timing Module

The Stratum 3 Timing Module 12 is used as the system timing reference. It is synchronized to a primary and secondary 8 kHz input reference signals and generates two output reference clocks signals, 19.44 MHz and 10 kHz. The 19.44 MHz and 10 kHz clocks feed the clock distribution interface 13, which distributes the clock signals to each resource module slot on the system midplane 14. Two programmable inputs allow system software controls of the operating modes in the timing module 12 through the SFB Clock Distribution and Control interface. Six output signals provide status and notify the supervisor CPU when an alarm condition has occurred in the module.

Table 1 shown in FIG. 2 details the Stratum 3 timing module operational modes and associated status and alarm states.

Clock Distribution

The clock distribution block 13 receives 19.44 MHz and 10 kHz clocks from the Stratum 3 timing module 12. LVDS clock repeaters 13a, 13b supply the 19.44 MHz and 10 kHz clocks differentially to each resource module slot on the system midplane 14. The clock repeaters 13a, 13b supplying the 19.44 MHz and 10 kHz clock groups to each midplane slot 14 share a common control signal which allows system software to enable either 19.44 MHz or 10 kHz to the slot based on the type of resource module plugged in.

The Trunk Interface Module (not shown) synchronizes to 19.44 MHz, and the CMTS module synchronizes to 10 kHz.

BITS Clock Interface

The SRM7410 (control card for BSR 64000) provides two E1/T1 interfaces that are used primarily to receive synchronization timing from a Building Integrated Timing Supply (BITS). BITS timing information received over the E1 or T1 network is used for timing synchronization in the BSR 64000 system.

As shown in FIG. 3, the E1/T1 subsystem 20 is implemented using PMC Sierra PM4351 Combined E1/T1 transceiver/Framer (COMET) devices 21a, 21b, Stratum 3 Timing module 22 and the MPC8260 (element 23). The E1 (2.048 Mbit/s) or T1 (1.544 Mbit/s) frames flow from the BITS network through the SRM7410 I/O module 24 to COMET devices (21a, 21b) on the SRM7410 via the system midplane 25.

All COMET framing, alarms, and operating modes are software configurable through an 8-bit processor interface controlled by the Supervisor CPU (MPC8260). The COMET recovers 8 kHz clocks from E1/T1 frames sourced by the BITS; these clocks are selected via a selector to be used as an input reference to the Stratum 3 Timing module 22. The Stratum 3 Timing module 22 performs clock regeneration.

BITS Clock Redundancy

The SRM7410 I/O module 24 provides E1/T1 BITS clock access ports to both SRM7410 modules in the system. The block diagram 30 in FIG. 4 shows the redundant BITS clock connections from I/O access ports 33 to SRM7410s (elements 31*a*, 31*b*).

SONET Clock

A reference clock source can be derived from the SONET network interface and delivered to the system timing module(s) via the BSR midplane 32.

This function is implemented in the SONET Trunk Interface Module and provides two 8 KHz reference signals to redundant timing modules located on the SRMs 31*a*, 31*b*. This enables the system to synchronize off of any SONET port within any Trunk Interface Module. This task is accomplished using the RX-FRAME-OUT pin of the S1201 (CONGO) devices. This output provides an 8 KHz signal based on received frames. Since there are as many as four ports in a Trunk Interface Module, a multiplexer is used to select the desired recovered receive 8 KHz signal for delivery to the SRM modules.

FIG. 5 shows a block diagram of an exemplary embodiment 40 of a circuit used, which includes a selector 41 and a TTL to LVDS fanout buffer 42.

Figure 6:
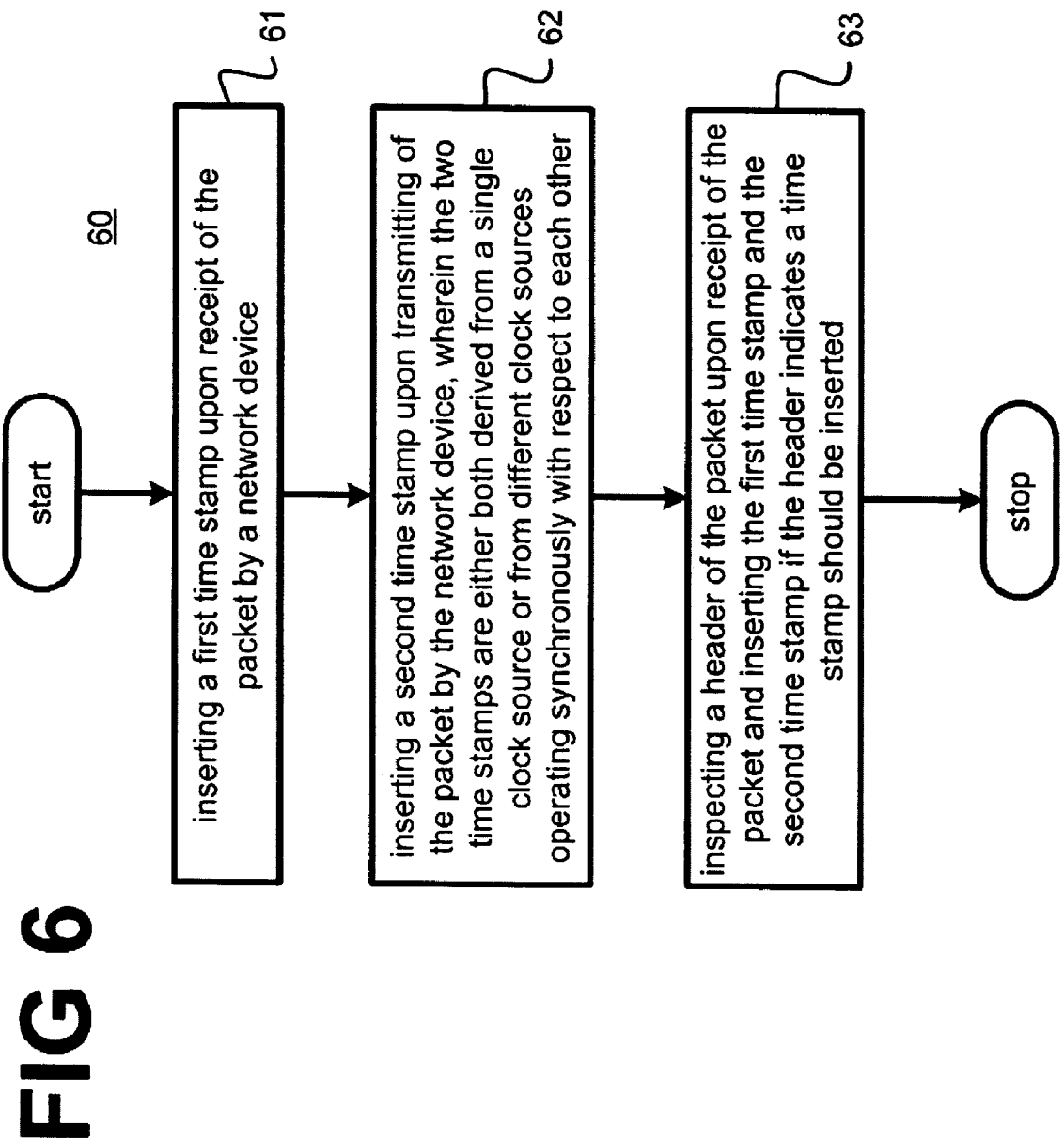
FIG. 6 depicts a flow chart of an exemplary embodiment of a method for processing packets in a network according to still another aspect of the present invention.

Turning to FIG. 6, shown therein is an exemplary embodiment 60 of a method for processing one or more packets in a network. In step 61, a first time stamp is inserted upon receipt of the packet by a network device. In step 62, a second time stamp is inserted upon transmitting of the packet by the network device, wherein the first time stamp and the second time stamp are either both derived from a single clock source or from different clock sources operating synchronously with respect to each other. In step 63, a header of the packet is inspected upon receipt of the packet and the first time stamp and the second time stamp are inserted if the header indicates a time stamp should be inserted. Alternatively, this step 63 could occur by inspecting a header of the packet upon receipt of the packet and not inserting the first time stamp or the second time stamp unless the header indicates a time stamp should be inserted.

Turning to FIG. 7, shown therein is another exemplary embodiment 70 of a method for processing packets in a network according to another aspect of the present invention. In step 71, a first time stamp is inserted in a received packet upon receipt and a second time stamp is inserted in the received packet just prior to transmitting the received packet, if upon receipt inspection of the header indicates that a time stamp should be inserted. In step 72, the first time stamp to the second time stamp are compared to obtain a difference between the first and second time stamps. In step 73, either the first or second time stamp is overwritten with the difference and/or the difference is recorded elsewhere in the received packet.

FIG. 8 shows an exemplary embodiment of a computer network 80, which includes several network devices 81, 83, 86 to receive and forward a plurality of packets. These network devices are coupled to one another over one or more networks 82, 84 and possibly via one or more firewalls 85. Each network device 81, 83, 86 includes an input/output module or processor 81*a* to insert a first time stamp upon receipt of each of the plurality of packets and to insert a second time stamp prior to transmission of each of the plurality of packets. Each of the network devices also includes a clock source 81*b* coupled to the input/output module, said clock source to generate a clock signal from which the first time stamp and the second time stamp are derived. The input/output module 81*a* inspects a header of the packet upon receipt and inserts the first time stamp and the second time stamp if the header indicates a time stamp should be inserted.

Other hardware implementations will be apparent to those of skill in this art upon review of the above.

Where the insertion of the timestamp may be desired, it may also be performed by associating the timestamp with the packet as well as any information that would be needed to decide to insert the timestamp, such as the incoming interface number. The actual insertion of the timestamp may then be performed at a later point or subsequent point in the processing of the packet, but the effect would be as if the timestamp was inserted at the earlier time or point in the packet processing. The same can also apply to insertion of the second time stamp. The act of deciding to insert the timestamp can be performed early in the packet processing and the result of the decision can be then associated with the packet, such as inserting a flag, and the actual timestamp can then be inserted later or subsequently in accordance with the earlier decision.

As used herein, network device can also refer to a module within a network device so that performance can be measured on a module basis or across one or more modules in a series within a network device. In general, a network device as used herein is simply a device that processes packets in network.

Although various embodiments are specifically illustrated and described herein, it will be appreciated that modifications and variations of the invention are covered by the above teachings and are within the purview of the appended claims without departing from the spirit and intended scope of the invention. For example, certain versions of Internet Protocol are used in the above descriptions, but subsequent versions may also be applicable. In addition, the above description relates to the Motorola BSR 64000, but the inventions herein could be implemented in any packet forwarding or Internet device. Furthermore, these examples should not be interpreted to limit the modifications and variations of the invention covered by the claims but are merely illustrative of possible variations.

What is claimed is:

1. A method (60) for processing one or more packets in a network comprising:

inserting (61) a first time stamp upon receipt of the packet by a network device;

inserting (62) a second time stamp upon transmitting of the packet by the network device; and inspecting (63) a header of the packet upon receipt of the packet and inserting the first time stamp and the second time stamp if the header indicates a time stamp should be inserted.

2. The method according to claim 1, wherein (62) the first time stamp and the second time stamp are both derived from a single clock source.

3. The method according to claim 1, wherein (62) the first time stamp and the second time stamp are derived from different clock sources operating synchronously with respect to each other.

4. A computer network (80) comprising a plurality of network devices (81, 83) to receive and forward a plurality of packets, each of said plurality of network devices (81,83) including:

an input/output module (81a) to insert a first time stamp upon receipt of each of the plurality of packets and to insert a second time stamp prior to transmission of said each of the plurality of packets; and a clock source (81b) coupled to the input/output module, said clock source to generate a clock signal from which the first time stamp and the second time stamp are derived;

wherein a header of the packet is inspected upon receipt of the packet and the first time stamp and the second time stamp is inserted if the header indicates a time stamp should be inserted.

5. A method (60; 70) for determining performance of a network device for processing a plurality of packets comprising:

inserting (61; 71) a first time stamp in a received packet upon receipt;

inserting (62; 71) a second time stamp in the received packet just prior to transmitting the received packet; and inspecting (63) a header of the packet upon receipt of the packet and inserting the first time stamp and the second time stamp if the header indicates a time stamp should be inserted.

6. The method (70) according to claim 5, further comprising:

comparing (72) the first time stamp to the second time stamp to obtain a difference between the first and second time stamps.

7. The method (70) according to claim 6, further comprising (73) recording the difference in the received packet.

8. The method (70) according to claim 6, further comprising (73) overwriting one of the first and second time stamps with the difference.

9. A method (70) for measuring a performance of a network device for processing a plurality of Internet Protocol packets comprising:

inserting (71) a first time stamp in a received Internet Protocol packet upon receipt;

comparing (72) the first time stamp to a clock just prior to transmitting the received Internet Protocol packet;

overwriting (73) the first time stamp with a difference between the first time stamp and the clock just prior to transmission of the Internet Protocol packet; and inspecting a header of the Internet Protocol packet upon receipt and inserting the first time stamp and the second time stamp if the header indicates a time stamp should be inserted.

10. An apparatus (81) for measuring performance of a network device comprising:

a processor (81a);

a clock (81b) coupled to the processor (81a) and outputting a clock signal, said processor (81a):

inserting a first time stamp upon receipt of a packet; and inserting a second time stamp upon transmitting the packet, wherein said processor (81a) during packet transmission inspects each packet for presence of a field in a packet header, which field indicates timestamps should be added, upon which positive determination only said processor inserts the second time stamp.

11. A network device (10) to manage multiple synchronization input references comprising:

a building integrated timing supply providing a first clock source;

a network interface providing a second clock source;

an input reference module (11) receiving a plurality of clock signals from the first and second clock sources, said input reference module (11) outputting a primary reference signal and a secondary reference signal from among the plurality of clock signals;

a stratum 3 timing module (12) coupled to the input reference module (11) and receiving the primary reference signal and the secondary reference signal from the input reference module, generating two output reference clocks signals, a first of which is clocked at a rate acceptable to a first network module and a second of which is clocked at a rate acceptable to a second network module; and a clock distribution module (13) coupled to the input reference module (11) and to be coupled to a first network module and to a second network module and for distributing the first output reference clock signal and the secondary output reference clock signal.

12. The network device according to claim 11, wherein the input reference module includes:

a clock receiver (11a) receiving a second clock signal;

a first multiplexer (11b) coupled to the clock receiver (11a) and receiving a first clock signal and said second clock signal and generating the primary reference signal;

a second multiplexer (11c) coupled to the clock receiver (11a) and receiving the first clock signal and said second clock signal and generating the second reference signal.

13. The network device according to claim 11, wherein the clock distribution module (13) includes:

a first clock repeater receiving the first output reference clock signal and distributing first output reference clock signal; and a second clock repeater receiving the secondary output reference clock signal and distributing the secondary output reference clock signal.

14. The network device according to claim 11, further comprising a processor:

receiving one of either the primary reference signal and the secondary reference signal;

inserting a first time stamp in a received network packet upon receipt of the received network packet, which said first time stamp is generated from said one of either the primary reference signal and the secondary reference signal; and inserting a second time stamp in a forwarded packet generated from the received packet, which forwarded packet is to be transmitted to a next network device in the network, just prior to transmission of the forwarded packet, which second time stamp is generated from said either one of the primary reference signal and the secondary reference signal.

* * * * *